Feb. 13, 1940. C. NUNZIATO 2,190,216
PIPE FITTING CLEANER
Filed Sept. 20, 1938
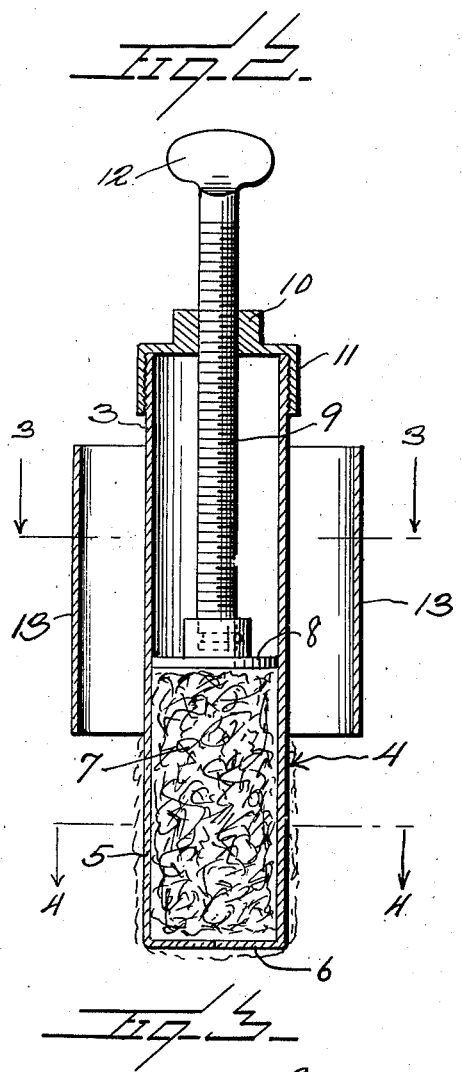
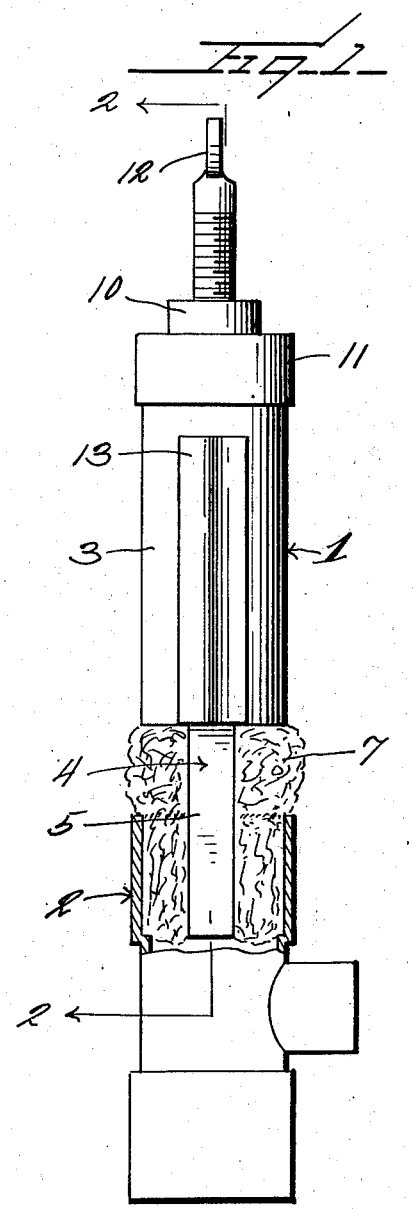
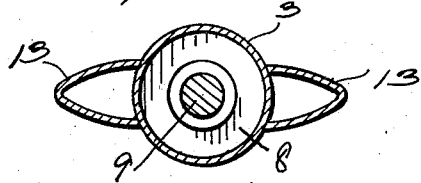
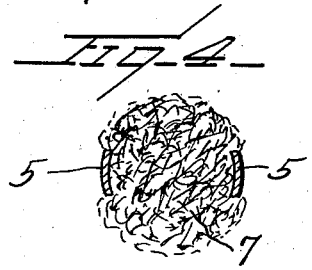
Inventor
Charles Nunziato
By Watson E. Coleman
Attorney Patented Feb. 13, 1940

2,190,216

UNITED STATES PATENT OFFICE 2,190,216

PIPE FITTING CLEANER

Charles Nunziato, Yonkers, N. Y.

Application September 20, 1938, Serial No. 230,858

1 Claim. (Cl. 15—211)

This invention relates to improvements in devices or tools for cleaning and polishing the interior surfaces of tubular bodies.

In the use of copper tubing or pipes for water systems, it is highly important in joining the ends of pipes with couplings, where the pipe ends are inserted into the couplings, that the contacting or opposing surfaces of the pipe and coupling are perfectly clean and smooth, otherwise it will be extremely difficult or impossible to effect a tight soldered joint between the two pieces. Such copper fittings are not connected together by screw threads as in ordinary iron pipe systems but are connected by soldering and for this reason the smoothness of the contacting surfaces is of importance.

The present invention has for its primary object to provide a device which is designed to replace the use by hand of sandpaper, emery cloth or steel wool for smoothing out the interior surfaces of couplings by providing a holder for a mass of steel wool which is designed to be inserted into a coupling and, when rotated, to thoroughly clean and polish the interior surface of the same.

Another object of the invention is to provide a steel wool carrier for the purpose described in which a surplus of the abrasive material may be stored and advanced into working position as the material is used up, thereby insuring a ready supply of abrasive for use over a comparatively long period of time.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claim.

In the drawing:

Fig. 1 is a view in elevation of the device embodying the present invention showing the same in working position with respect to a copper pipe coupling, the latter being partially in section.

Fig. 2 is a sectional view on the line 2—2 of Fig. 1 through the implement per se.

Fig. 3 is a horizontal section on the line 3—3 of Fig. 2.

Fig. 4 is a horizontal section on the line 4—4 of Fig. 2.

Referring to the drawing, the numeral 1 generally designates the implement embodying the present invention while the numeral 2 designates a T-coupling of the type employed in joining copper piping. The device 1 consists of a receptacle body 3 which is here shown as being in the form of a cylinder, from one end of which there extends the elongated U-shaped yoke 4 having the two parallel side portions 5 and the cross connecting end portions 6. This yoke is here shown as forming an integral part of the tubular receptacle, being fastened by cutting out the sides of the cylinder forming the receptacle so as to leave the opposite spaced parallel portions forming the parts 5 and then turning in portions of the ends of these side parts to form the cross piece 6. However, it is to be understood that the invention is not to be limited to this specific construction as it will be obvious that the receptacle 3 may constitute a unit separate from the yoke 4 to which the yoke may be secured by soldering or in any other suitable manner. However, the width of the yoke 4 is substantially equal to the interior diameter of the end of the fitting 2 which is to be cleaned so that this yoke may be extended into the fitting and rotated so as to maintain proper alinement therewith and so as to wipe the interior surface of the fitting with the steel wool material 7 which is compressed in the yoke.

The steel wool 7 is placed within the receptacle 3 and is forced therefrom into the yoke by means of the pusher or follower 8 which is swivelly connected with a screw 9 which passes through and has threaded connection with the nut portion 10 of a cap 11. The cap 11 is threaded onto the end of the receptacle 3 opposite from the yoke 4 as shown, and the outer end of the screw 9 has the finger piece 12 by which the turning of the screw is facilitated.

In order to make the turning of the device easier, the cylinder is provided at opposite sides with the laterally projecting longitudinally extending wings 13. These wings may be formed in any suitable manner but they are here shown as each consisting of an elongated piece of metal bent along a line extending longitudinally thereof and midway of the side edges so as to form the body shown in Fig. 3, which is of V-shape cross section, the edge or apex of the V being directed outwardly while the longitudinal edges of the piece of metal are disposed against the wall of the cylinder and secured thereto in any suitable manner. This method of forming the wings insures the production of a body which is free of sharp edges which would hurt the hands of the user and is in addition an easy and economical way of making the wings which constitute the hand grip portions of the device.

From the foregoing, it is believed that the operation of the device will be readily understood as it is apparent that after a mass of the steel wool 7 has been forced down into the yoke 4, the yoke is inserted into the end of the fitting and the entire implement is turned until the desired smoothness of the fitting surface has been obtained and as the steel wool wears away, more may be forced from the receptacle by turning the screw 9 so that the user is always certain of having a firm contact between the steel wool mass and the wall of the fitting against which the abrasive contacts.

What is claimed is:

A device for cleaning the interior surface of a tubular body, comprising a cylindrical receptacle open at one end, a cap covering the other end of the receptacle and having a threaded nut as an integral portion thereof, a screw extending longitudinally into the receptacle through and in threaded connection with said nut, a head carried on the inner end of said screw and slidable in the receptacle, an elongated frame extending from the open end of the receptacle and comprising two longitudinally extending side portions forming continuations of the wall of the receptacle and a cross connecting portion between the side portions at the ends thereof remote from the receptacle, and a body of abrasive material filling said frame and extending into the receptacle and adapted to be forced from the receptacle into the frame as necessary to maintain the frame filled.

CHARLES NUNZIATO.